Nov. 14, 1933.  A. W. HAYDON  1,935,208

ELECTRIC MOTOR

Filed Sept. 16, 1931  4 Sheets-Sheet 1

INVENTOR
Arthur William Haydon
BY
ATTORNEYS

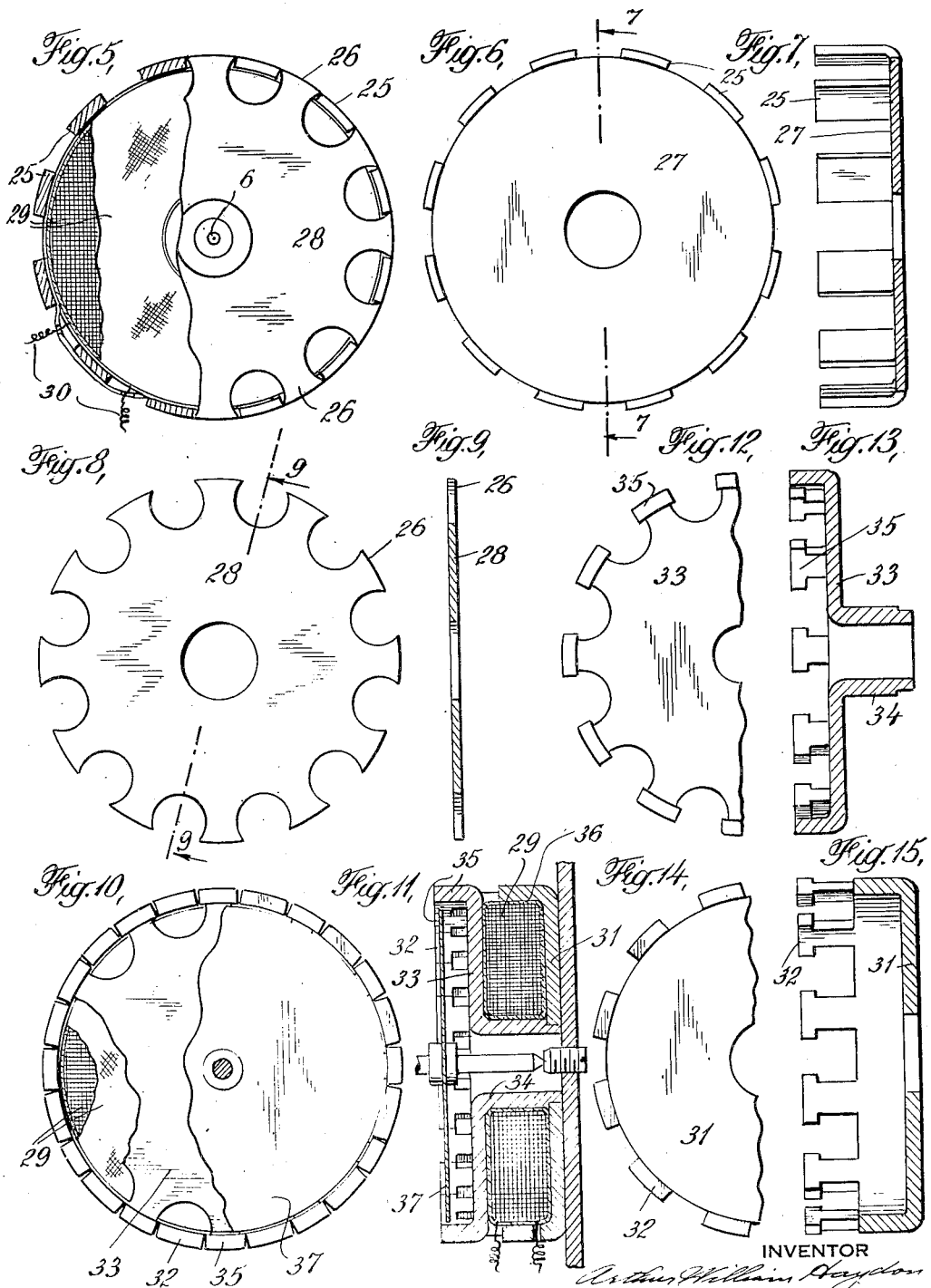

Nov. 14, 1933.        A. W. HAYDON        1,935,208
ELECTRIC MOTOR
Filed Sept. 16, 1931        4 Sheets-Sheet 3
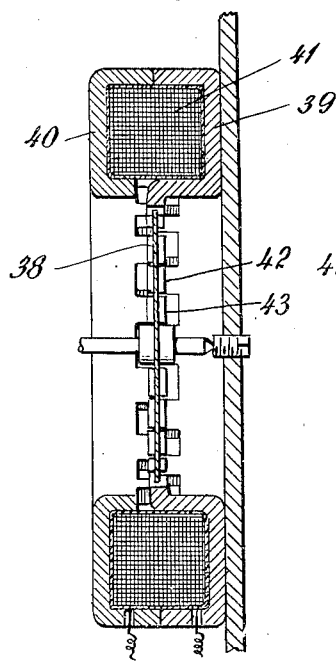
Fig. 16,
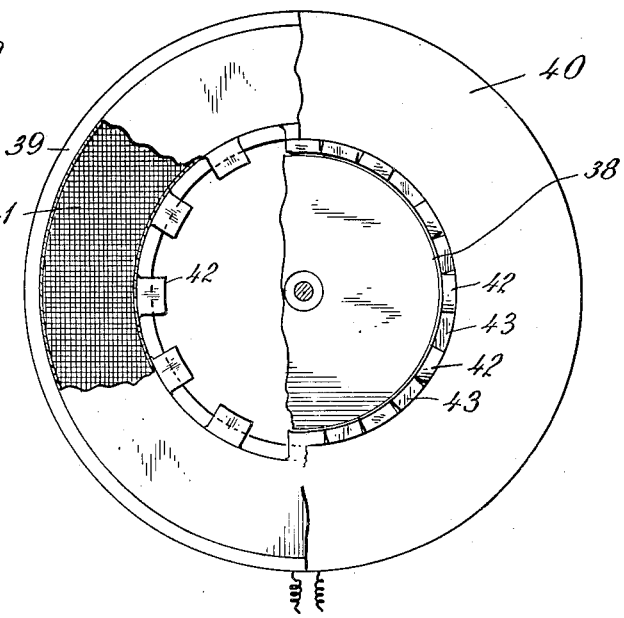
Fig. 17,
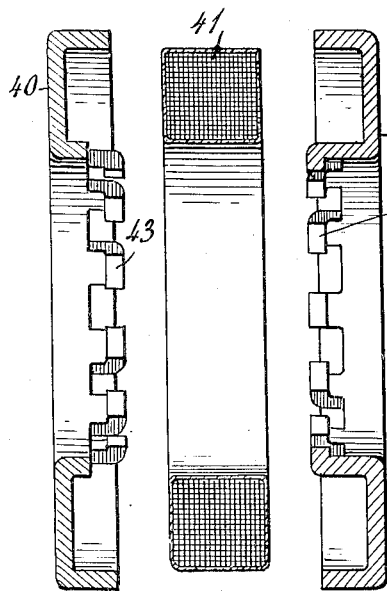
Fig. 18,
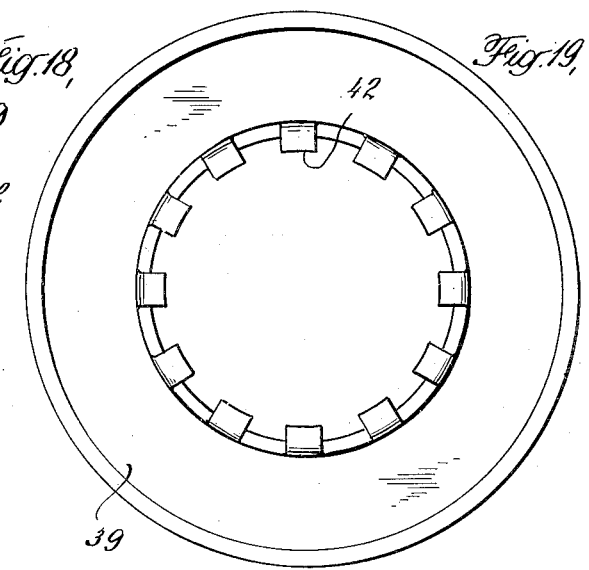
Fig. 19,
INVENTOR
Arthur William Haydon
BY
Attorneys Nov. 14, 1933.  A. W. HAYDON  1,935,208
ELECTRIC MOTOR
Filed Sept. 16, 1931   4 Sheets-Sheet 4
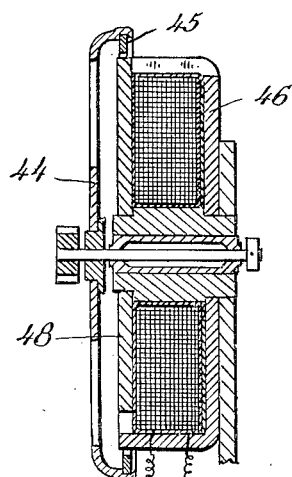
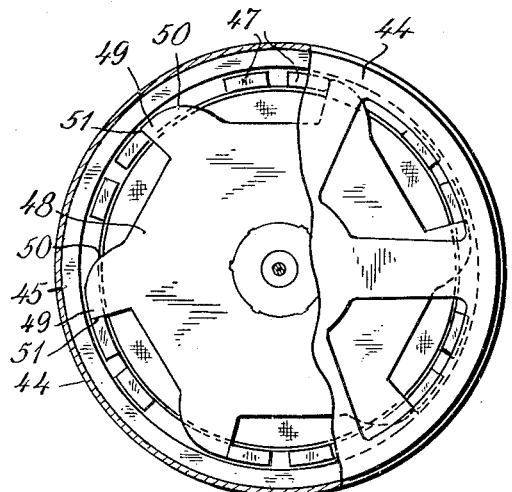
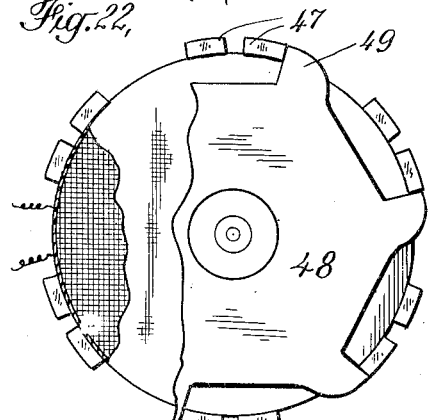
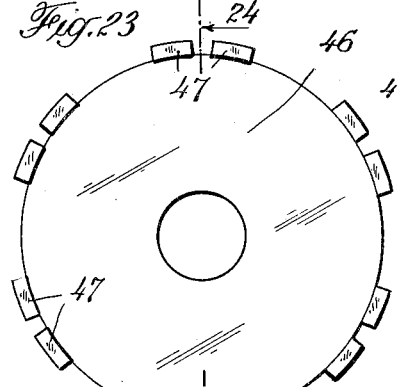
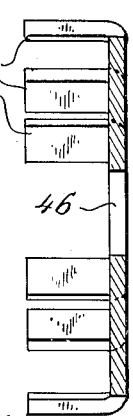
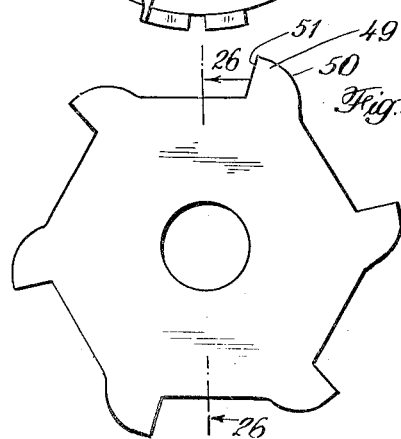
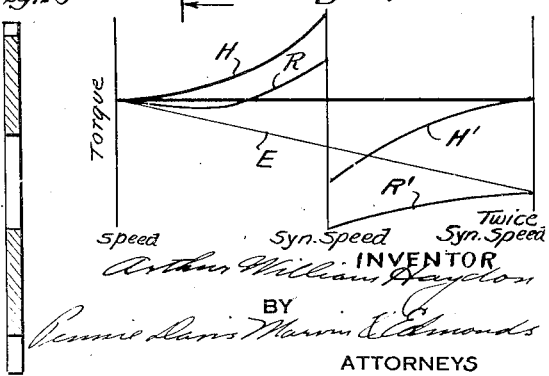

Patented Nov. 14, 1933

1,935,208

UNITED STATES PATENT OFFICE 1,935,208

ELECTRIC MOTOR

Arthur William Haydon, Waterbury, Conn.

Application September 16, 1931
Serial No. 563,047

30 Claims. (Cl. 172—275)

This invention relates to electric motors and more particularly to an improved hysteresis motor.

This application is a continuation in part of my application, Serial No. 407,636, filed November 16, 1929.

One of the objects of my invention is to provide a hysteresis motor having an alternating field as distinguished from a rotating field, the motor being capable of developing useful torque at speeds other than synchronous speed. A further object of my invention is to provide a hysteresis motor of such a nature that the current drawn from the line is kept within reasonable limits and this is accomplished without utilizing a primary motor circuit of high resistance. The several parts of my improved motor are preferably constructed and arranged in such a manner that the eddy currents in the rotor are reduced to a minimum and a primary field of substantially uniform intensity is provided at all points.

My improved hysteresis motor in its preferred embodiment may be characterized as a nonself-starting hysteresis motor for alternating current, the motor being capable of producing a strong torque at synchronous speed and sufficient torque at sub-synchronous speeds to enable the motor to pull into synchronism automatically after the motor is brought by extraneous means to a speed somewhat above half synchronous speed.

My improved motor comprises a multipolar field in which alternate poles are of opposite sign at any given instant and a rotor element formed wholly or in part of a material having a high hysteresis coefficient, such as hardened steel. The motor is primarily intended for use with single phase alternating current, the current being supplied to a primary winding so as to produce alternate north and south poles with the polarity of each pole reversing in synchronism with the supply current. The rotor element is arranged in close proximity to the primary pole pieces so that at any instant the magnetization of any one field pole produces a magnetic pole of opposite sign in the adjacent portion of the rotor. An instant later the polarity of the field pole will be changed due to the reversal of the primary current but due to the high hysteresis coefficient of the rotor the induced pole in the rotor will not immediately change and accordingly the rotor pole will be repelled by the adjacent field pole and attracted by the next field pole, thereby creating a torque tending to rotate the rotor element. The rotor will thus continue to rotate in the direction of its initial impetus, provided the rotor has been caused by some extraneous means to rotate at a speed such that the hysteresis torque above described is of greater magnitude than the eddy current torque.

By using a relatively large number of field poles the rotor element may operate at a correspondingly low speed and this is highly advantageous when the motor is employed in association with a clock train since it permits the use of a comparatively low gear ratio in the clock train and reduces gear noise and wear due to friction. Although the hysteresis motor of the present invention is peculiarly fitted for association with clock mechanism, it is not the intention to confine the use of the motor to the driving of clock mechanisms for the motor may be otherwise advantageously employed.

According to the preferred embodiment of my invention the motor comprises a multipolar field magnet having alternate pole pieces so proportioned and arranged in contiguous arrangement to each other that a magnetic field of gradually varying intensity is produced around the field structure. The rotor element is preferably of uniform contour and symmetrical in all respects. In other words the rotor element is not provided with geographical poles. The intensity of the primary field is preferably kept within limits such that the rotor is not magnetized beyond the point of saturation.

There are two general types of synchronous electric clocks now in use; those equipped with self-starting, and those equipped with nonself-starting motors.

These clocks depend upon the constant regulation of the frequency of the current supplied for their accuracy and consequently any interruption in current causes an inaccuracy in the time indicated by the clock and therefore means must be provided for indicating that there has been an interruption in the current supply, as otherwise the clock would be misleading.

In the self starting clocks now in common use this is taken care of by an indicator which drops into place after an interruption and shows that the clock is no longer correct. This, however, has many disadvantages: (1) the additional cost of manufacturing such a device, (2) it is a source of noise within the clock, and (3) must be reset by hand after every interruption.

To get away from these difficulties a nonself-starting motor may be resorted to. Such clocks stop upon an interruption and thereby indicate their inaccuracy by virtue of the fact that they are stopped. In the present art, however, the nonself-starting motors used stop upon the very slightest interruptions of current, such as occur quite frequently during thunder storms. These interruptions of current are very short, seldom exceeding one second in duration, and obviously would have no practical effect upon the accuracy of the clock, yet the clock stops and remains so until again started by hand. The only thing one can do with such a clock during a thunder storm is to wait until the storm is over and then restart it. Thus, from a time-keeping stand point, the interruption might just as well have been as long in duration as the storm itself.

With present conditions of electric supply service, long interruptions of current are very infrequent, but short interruptions during lightning flashes are unavoidable. It therefore can readily be seen that the ideal clock would be one which would keep going over these interruptions of extremely short duration which do not appreciably affect the accuracy of the clock, but which would stop upon longer interruptions that would cause the clock to be misleading if it started again when the current resumed.

An object of my invention is to provide a motor for a clock mechanism which shall be capable of bridging over minor interruptions in current, but which will stop for prolonged interruptions.

The motor of the present invention is capable of picking up speed from speeds below synchronism, so that after an interruption in current it will continue coasting, gradually decreasing in speed until the current resumes whereupon it will pick up speed and run again at synchronous speed as before. This motor is preferably provided with a rotor of large diameter which materially increases its fly-wheel effect and keeps it going during interruptions of short duration.

A further objection to clocks equipped with nonself-starting motors of the type now on the market is that they are quite hard to start after they are once stopped, unless they are provided with some special device to facilitate starting. This is due to the fact that these clocks have motors of the reaction type, the rotors of which are toothed in shape, or are otherwise geographically polarized, and in consequence can deliver power at synchronous speed only, and in being started must not only be rotated at exactly synchronous speed, but must also attain the proper phase relationship between rotor and field before they will run. In other words the polar projections on the rotor must attain a definite angular relationship with the field poles at instants of maximum magnetic intensity of the field and must revolve in exact synchronism with the pulsations of the field before the rotor will "lock in" with the pulsations of the field and run continuously. For starting these motors means are provided for manually spinning the rotor at a speed greater than synchronous speed and the rotor is thereafter allowed to coast down to synchronous speed. However, unless the rotor in slowing down happens to come into the proper phase relationship with the field at the instant when synchronous speed is reached, it will not run but will suddenly jerk through synchronous speed and stop. It is entirely a matter of chance whether or not the rotor in slowing down will attain this proper phase relationship and "lock in" with the pulsations of the field, the chances being in most cases approximately four to one that the rotor will not do so. Thus it is often necesary to spin the rotor several times before it will continue to run.

To get away from this difficulty several types of "inertia devices" have been devised which enable the rotor to shift into the correct phase relationship with the field and maintain synchronous speed sufficiently for the rotor to "lock in" with the pulsations of the field.

A further object of my invention therefore is to provide a nonself-starting motor having a substantially geographically nonpolar rotor wherein its magnetic poles are capable of shifting through its mass and thereby attaining the proper phase relationship with the field regardless of the chance physical relationship between rotor and field when the rotor has coasted down to synchronous speed after being spun by external means.

The ability of my motor to pick up speed from speeds below synchronism further facilitates starting as the motor may be given a spin at almost any speed either below or above synchronism and will itself resolve to synchronism.

Further objects and details will appear from a description of the invention in conjunction with the accompanying drawings, wherein, Fig. 1 is an elevation of an electric clock embodying my invention, the parts being cut away to illustrate details of construction;

Fig. 5 is an elevation of the primary member of the motor, parts being cut away to show details of construction;

Fig. 6 is an elevation of one section of the field casing;

Fig. 7 is a vertical section view of the element shown in Fig. 6;

Fig. 8 is an elevation of the other section of the field casing shown in Fig. 5;

Fig. 9 is a vertical section view of the element shown in Fig. 8;

Fig. 10 is an elevation of another embodiment of the motor, parts being cut away to show details of construction;

Fig. 11 is a vertical section view of the motor shown in Fig. 10;

Fig. 12 is a fragmentary elevation of one section of the field casing shown in Figs. 10 and 11;

Fig. 13 is a vertical section view of the casing element shown in Fig. 12;

Fig. 14 is a fragmentary elevation of the other section of the field casing shown in Figs. 10 and 11;

Fig. 15 is a vertical section view of the casing element shown in Fig. 14;

Fig. 16 is a vertical section view of another embodiment of my improved motor;

Fig. 17 is an elevation of the motor illustrated in Fig. 16, parts being cut away to show details of construction;

Fig. 18 is a vertical section view of the casing sections and coil of the motor of Figs. 16 and 17;

Fig. 19 is an elevation of one of the casing sections of Fig. 18;

Fig. 20 is a vertical section view of still another embodiment of my improved motor;

Fig. 21 is an elevation of the motor shown in Fig. 20, parts being cut away to show details of construction;

Fig. 22 is an elevation of the motor field member shown in Figs. 20 and 21, parts being cut away to show details of construction;

Fig. 23 is an elevation of one of the field casing sections of Fig. 22;

Fig. 24 is a vertical section view of the casing section shown in Fig. 23;

Fig. 25 is an elevation of the other casing section shown in Fig. 22;

Fig. 26 is a vertical section view of the casing section shown in Fig. 25 and

Fig. 27 is a diagram illustrating the speed torque characteristics of my improved motor.

Figure 1:
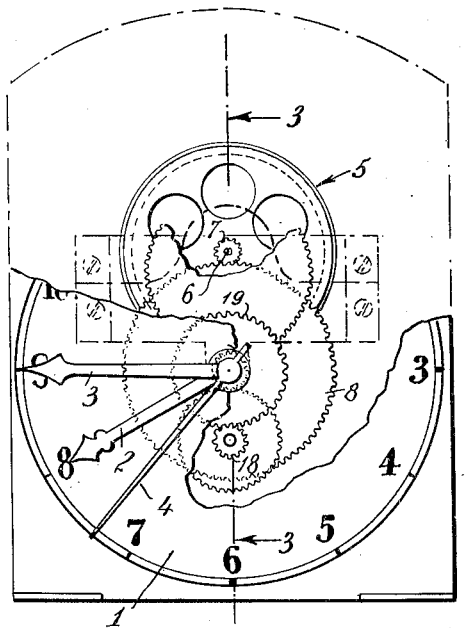
Figure 2:
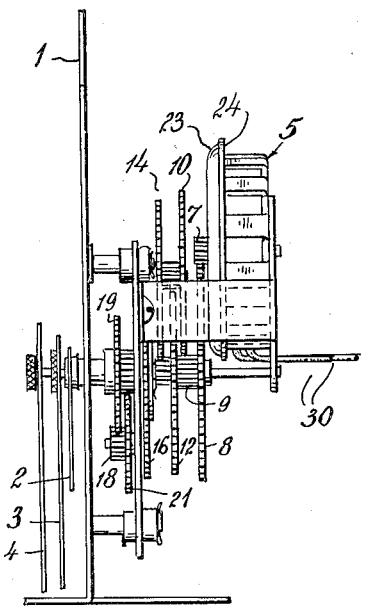
Fig. 2 is a side elevation of the motor and clock mechanism shown in Fig. 1.
Figure 3:
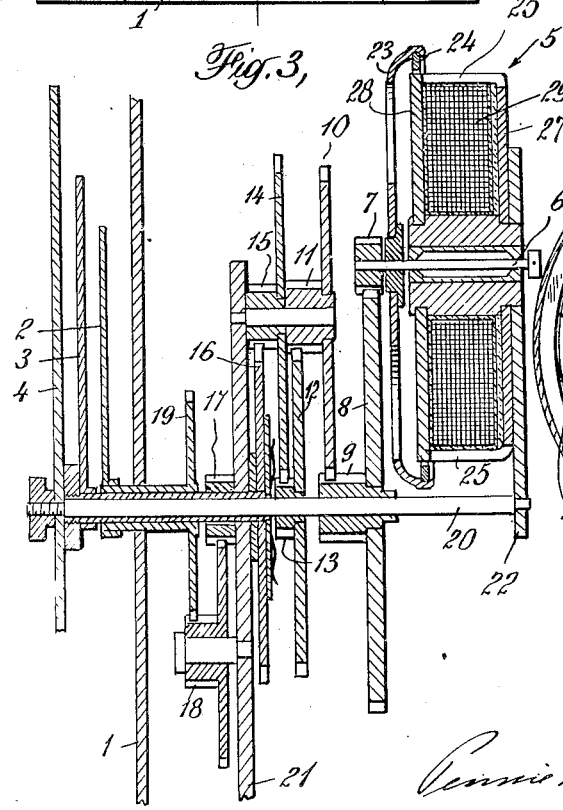
Fig. 3 is an enlarged vertical section view of the clock motor and gear train shown in Figs. 1 and 2.

The invention as illustrated in Figs. 1 to 9 inclusive comprises an electric motor arranged to drive a clock mechanism. As shown in Figs. 1 to 3 inclusive, the clock comprises a dial 1, an hour hand 2, a minute hand 3 and a second hand 4. The hands of the clock are driven by a motor 5 and by referring to Fig. 3 it will appear that the motor shaft 6 drives the second hand 4 through a train of gears 7, 8, 9, 10, 11 and 12. The minute hand 3 is driven through the additional gears 13, 14, 15 and 16 and the hour hand 2 is driven through the additional gears 17, 18 and 19. The minute and hour hands are carried by separate sleeves supported by the shaft 20 which carries the second hand 4. The shaft 20 is supported by brackets 21 and 22 and the bracket 22 also supports the motor 5.

The motor illustrated in Figs. 1, 2 and 3 comprises a rotor member 23 mounted on the shaft 6. This rotor member may be in the form of a spider supporting a continuous ring-shaped armature 24. The rotor, or at least that portion of it comprising the armature, is preferably made of hardened steel, or other material having a high hysteresis coefficient so that it offers considerable resistance to any attempt to change the magnetism of the armature.

Figure 4:
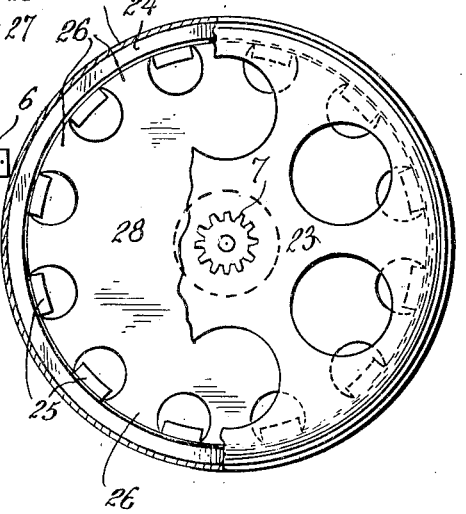
Fig. 4 is an elevation of the clock motor with portions cut away to illustrate details of construction.

The rotor armature 24 is mounted in close proximity to two sets of field poles 25 and 26. These two sets of pole pieces 25 and 26 (best illustrated in Figs. 4 to 9 inclusive) are carried by separate field casing sections 27 and 28 respectively. The casing section 27 (see Figs. 6 and 7) comprises a disc having lateral projections, the ends of which constitute the pole pieces 25. The casing section 28 comprises a disc provided with radial projections forming the pole pieces 26. In other words the edge of the disc 28 is scalloped as best illustrated in Fig. 8 to provide a series of projections constituting the pole pieces 26, the spaces between these projections being just wide enough to accommodate the pole pieces 25 of the other casing section 27, as best illustrated in Figs. 4 and 5. It will be noted that the armature 24 of the rotor member surrounds the pole pieces and it will be understood that the most active portions of the pole pieces consist of those portions of the same directly opposite the rotor armature. Upon referring to Figs. 4 and 5 it will be noted that these outer portions of the pole pieces are so arranged that adjacent portions are substantially in contact with each other, these adjacent portions constituting the pole tips.

A single coil of insulated magnet wire 29 is enclosed between the two sections 27 and 28 of the field casing. Single phase alternating current may be supplied to this coil from any suitable source through the leads 30. The radial portions of the casing sections are located on opposite sides of the coil and accordingly at any given instant these two sections are magnetized in such a way that they are of opposite polarity. Accordingly alternate pole pieces are of opposite polarity at any given instant and due to the fact that the current supplied to the coil 29 is an alternating current the polarity of each pole piece alternates in synchronism with the current. It thus appears that an alternating field is produced as distinguished from a rotating field, or, in other words, the field is a fixed axis field.

The operation of the motor may be understood by assuming that at a given instant the current flowing in the coil 29 is in such a direction as to cause the pole pieces 25 to become north poles and the pole pieces 26 to become south poles. The north poles will induce corresponding south poles in the adjacent portions of the armature 24. If the rotor is then turned by hand, or other extraneous means, the induced south poles of the rotor armature will move toward the south poles of the pole pieces 26. If the rotor is rotating at a speed below synchronous speed the pole pieces 26 will become north poles before the induced south poles in the rotor armature come opposite the pole pieces 26 and at the same time the pole pieces 25 will be changed to south poles which act to repel the south poles in the rotor armature at the same time they are being attracted by the north poles in the pole pieces 26. This produces a torque tending to accelerate the rotation of the armature and this torque exists because of the fact that the armature is of material having a high hysteresis coefficient which makes the armature resist the tendency of the field poles to suddenly reverse the polarity of those portions of the armature here under consideration. In other words the residual magnetism in the armature tends to preserve the polarity of the armature and to this extent a couple is produced tending to accelerate the rotation of the armature. If the armature is rotating at a relatively low speed the polarity of any given section of the armature will be changed but this occurs at a slow rate due to the high hysteresis coefficient of the armature and the effect is to produce a field in the armature lagging behind the primary field to an extent such that the reaction of the two fields produces a positive torque. This effect is most pronounced in an armature such as that illustrated in Figs. 1 to 4 inclusive, that is, in an armature that is continuous and without geographical poles. The magnitude of this torque is also affected to a considerable extent by the relative arrangement of the two sets of pole pieces 25 and 26 and it has been found that the best effect is obtained when these pole pieces are substantially in contact with each other, thus producing a primary field of gradually varying intensity around the entire periphery of the primary field structure.

After synchronous speed is reached then each portion of the rotor armature possesses a fixed polarity. The motor then operates as a synchronous motor and the speed of rotation is that determined by the frequency of the supply current and the number of field poles, and it will be understood that the larger the number of poles the lower the synchronous speed. It is desirable to have two or more pairs of poles and it is feasible to have 24 poles or even a larger number. With a given field, the eddy currents induced in the rotor can be reduced by increasing the number of poles and this is desirable because the eddy currents produce a negative torque in the motor which opposes the normal hysteresis torque.

The action of the motor is represented by the speed torque curves of Figure 27. The curve H represents the hysteresis torque at speeds between zero and synchronous speed. This is the torque above described as being due to the interaction of the primary and secondary fluxes, the secondary flux being out of phase with respect to the primary flux due to the high hysteresis coefficient of the rotor armature. In Fig. 27 the eddy current torque is represented at E. This torque is negative at all speeds with the magnitude of this torque increasing as the speed increases. This is due to the fact that there is no rotating primary flux which would react with the eddy current flux to produce positive torque. The curve R of Fig. 27 represents the resultant torque and it will be noted that this torque is positive at speeds above approximately half synchronous speed. In other words the hysteresis torque is greater in magnitude than the eddy current torque within this portion of the starting period of the motor. At speeds below half synchronous speed the eddy current torque more than offsets the small positive hysteresis torque, hence the necessity for giving the rotor an initial impetus sufficient to bring it up to a speed in the neighborhood of—say ½ to ⅔ synchronous speed. After this is done the motor will fall into synchronism and continue operating at synchronous speed. At speeds above synchronous speed the hysteresis torque is negative and decreases in magnitude to zero at twice synchronous speed. This is represented at H' in Fig. 27. The resultant torque due to hysteresis and eddy current action between synchronous speed and twice synchronous speed is shown at R' and it will be noted that this is a strong negative torque. The characteristics of the motor are such that as synchronous speed is passed the torque developed by the motor suddenly changes from a maximum positive value to a maximum negative value and because of this characteristic of the device it can be used for a number of useful purposes in addition to serving as a synchronous motor. For example, it can be used as a speed governing device capable of maintaining the speed of a normally high speed asynchronous motor at a fixed value corresponding with the synchronous speed of the controlling device.

The area of the hysteresis loop for the material of which the armature is made represents a definite amount of energy consumed in the performance of the magnetic cycle and the hysteresis coefficient is a measure of this energy. As the motor speed increases an increasing portion of this energy is converted into motive power supplying torque to drive the motor.

From the above description of the magnetic cycle which takes place during each cycle of the alternating current when the rotor is motionless, it can be seen that the magnetization of the steel rotor lags in intensity behind the magnetizing force and holds this relationship throughout the entire cycle.

This definite phase relationship may be maintained approximately in two ways. One is by the changing of the magnetization in the steel as described above, whereby a part of the energy of the magnetic field is consumed in overcoming the hysteresis of the steel and is dissipated as heat, the area of the hysteresis loop being a measure of this dissipated energy; and the second is by allowing the rotor to shift through the magnetic field at an angular rate equal to the cyclic changes of the magnetizing force or magnetic field, whereupon a magnetic couple is produced between the magnetic field and the magnetization in the steel, and the energy which was formerly dissipated as heat may now be obtained as mechanical energy or motor torque. Thus the area of the hysteresis loop obtained when the rotor is motionless may be used as a comparative measurement of the work such a motor is capable of doing when running at synchronous speed.

At intermediate speeds the phase relationship referred to above is maintained partly by the angular shifting of the rotor and partly by the changing of the magnetization of the steel, whereupon the energy represented by the full hysteresis loop appears partly as heat and partly as mechanical energy, and the amount of mechanical energy delivered increases with the speed of the motor up to synchronism, following roughly the curve H of Fig. 27 which is the torque curve of the motor due to hysteresis alone.

One of the principal points which distinguishes this non self-starting motor from similar motors of the self starting type is that in a self starting motor the eddy currents developed in the rotor by the rotating field add their influence to the torque produced by the hysteresis of the steel and aid in causing the rotation of the rotor.

In a nonself-starting motor, on the other hand, the magnetic poles of the motor field do not rotate but simply reverse, and consequently the effect of the eddy currents developed in the rotor does not aid but hinders the rotation of the rotor.

It is common practice in motor design to make the rotor of thin laminations, because this breaks up the path which eddy currents would otherwise have through the steel. For the same reason the rotor of the present motor is very thin, being made, in the preferred motor, of .025" thickness sheet steel. The rotor support is preferably so shaped as to be well out of the influence of the magnetic field, and may be made of aluminum in order to reduce the weight of the rotor with consequent less bearing friction.

As already pointed out, the motor is designed with a large number of poles in the field, which gives it a low R. P. M. Since the drag due to eddy currents increases with the speed, this low R. P. M. helps materially in reducing eddy currents.

Sudden changes in the magnetic flux passing through the rotor will produce eddy currents within the rotor. I therefore prefer to make the field so that the poles are in contiguous relation to one another, with the result that stray fields are prevented from passing through the rotor, since the space between the field poles is less than the air gap of the motor. Consequently the magnetic field through which the rotor passes is substantially free from abrupt differences in magnetic densities, and the tendency to develop eddy currents is thereby greatly reduced. With the pole tips arranged close to each other the flux distribution in the air gap is modified to the extent that a considerable portion of the flux passes directly from each pole tip to the adjacent pole tip without traversing any portion of the rotor and the remaining flux passing across the air gap between the pole pieces and the rotor is of greatest intensity in the vicinity of the center of each pole piece and of less intensity near the pole tips; there is a gradual variation in the intensity.

The effect of this design of the field poles may be strikingly demonstrated by simply increasing the space between the field poles until it is two or three times as great as the air gap of the motor. In this case it will be found that the torque of the motor has been very materially decreased and it is with difficulty that the motor can be made to run even at synchronous speed.

As already pointed out, as the strength of the magnetic field, i. e. the flux density, increases, the magnetization of the steel in the rotor increases only until the saturation point is reached. Here the magnetization reaches its maximum value and any further increase in the magnetizing force has no effect upon the magnetization of the steel in the rotor.

It is, therefore, desirable that the field coil, the field casing, and the rotor be so proportioned with due consideration for the frequency and the voltage of the current to be supplied, that the intensity of the magnetic field produced by the motor field does not exceed appreciably a value sufficient to cause a condition of magnetic saturation in the steel of the rotor.

As pointed out above it is desirable to employ a material for the armature having a high hysteresis coefficient. Several types of steel are now in common use for permanent magnets. Some of these are known as carbon, tungsten, chromium, nickel, or cobalt magnet steel. Such materials are satisfactory for my purpose and I refer to such material as magnet material. By increasing the length of a steel magnet it is possible to increase its resistance to being de-magnetized, or, in other words, it is possible to increase the amount of residual magnetism. Accordingly by making the diameter of the rotor as large as possible the length of the pole pieces can be made large and the poles induced in the rotor are of increased length. This results in an increase in the motor torque. The large diameter of the rotor also increases the lever arm of the forces acting on the rotor, whereby the torque is increased. It is desirable to make the rotor armature small in cross section in order that the magnetic field of the motor may be comparatively weak and yet produce sufficient flux through the armature with the flux concentrated in this small cross sectional area. This small cross sectional area also increases the ratio of length to cross section in the induced poles in the armature and this decreases the self demagnetizing effect which would otherwise lessen the amount of residual magnetism.

The above description relating to the operation of my improved motor applies to all of the embodiments illustrated in the accompanying drawings. It is to be understood that the details of construction can be varied without departing from the spirit of my invention. By way of illustrating typical modifications of my improved motor I have shown several dfferent specific forms in Figs. 10 to 26 inclusive. The form of motor shown in Figs. 10 to 15 inclusive is similar to that previously described except for the manner in which the two sections of the field casing are formed, and a further difference is that the field pole pieces face toward the axis of the rotor instead of radially outward. The casing section 31 comprises a disk having laterally extending projections forming pole pieces 32. This cup-shaped member is adapted to receive the second section 33 of the field casing, this section having a sleeve 34 fitting into an aperture in the casing section 31. The section 33 is provided with projections forming the pole pieces 35 that fit in between the pole pieces 32 of the casing section 31. The pole pieces 35 extend first at right angles to the pole pieces 32, or in other words radially, and then laterally with respect to the body portion of the section 33, these pole pieces being disposed between the pole pieces 32. The coil 29 is interposed between the two casing sections and insulated therefrom by a sheet 36 of insulating material. The rotor 37 comprises a disk, the outer periphery of which is located in close proximity to the pole pieces 32 and 35. This form of the motor is especially desirable where considerations of space are important for it will be noted that the rotor is of somewhat smaller diameter. A further advantage is that the rotor is protected by the field poles which act as a guard.

The form of motor illustrated in Figs. 16 to 19 inclusive is similar to that just described except that the pole pieces are so disposed that the rotor 38 is of even smaller dimensions as compared with the overall diameter of the field casing, than is the case with the motor illustrated in Figs. 10 to 15 inclusive. In Figs. 16 to 19 inclusive the two sections 39 and 40 of the field casing are identical and interchangeable. Each is provided with an annular recess adapted to receive a portion of the coil 41 and the inner periphery of each section is provided with a plurality of projections constituting the pole pieces. The pole pieces 42 on the section 39 are adapted to fit between the pole pieces 43 on the section 40 and as previously described it is preferable to have the pole pieces substantially in contact with each other, or at least closer together than the distance between the rotor and the pole pieces. This is true of all forms of the motor, although as hereinafter explained, it is feasible for some purposes to have some of the pole tips far apart provided the remaining pole tips are close together. In Figs. 20 to 26 inclusive I have illustrated a form of the motor in which some of the pole tips are arranged a considerable distance apart, the remaining pole tips being close together, if not in actual contact. The rotor 44 of Figs. 20 and 21 is similar to that shown in Figs. 1 to 3 inclusive in that it comprises a spider carrying an annular ring 45 constituting an armature cooperating with pole pieces facing radially outward. The field casing section 46 is provided with lateral split projections 47 constituting pole pieces. The casing section 48 is provided with hook-like projections forming radial pole pieces 49. It will be noted that corresponding portions of each of the projections 49 are cut away so that these pole tips are spaced a considerable distance from the adjacent pole pieces 47 as shown at 50. The other pole tips 51 are however in close proximity to the pole pieces 47. It has been found that even with this type of construction the pole pieces are sufficiently close together to provide a flux of gradually varying intensity around the field structure and there is sufficient leakage between the pole tips to provide the desired choking section limiting the line current. It will be undertsood however that this choking action is more pronounced where all of the pole tips are in close proximity to each other, or in actual contact with each other.

The split pole pieces 47 can be made integral instead of divided but in some cases it is desirable to have them separated so that shading coils can be provided on one section of each pole piece whereby a rotating primary field is produced. This makes the motor a self-starting motor.

It is to be understood that all forms of my improved motor can be used to good advantage in driving clock mechanism. For the reasons pointed out above my improved motor is especially suitable for this purpose because it is capable of synchronizing after the rotor is given an initial impetus sufficient to bring it to a speed somewhat above half synchronous speed. In clocks having an exposed second hand the motor can be started by merely turning the second hand, although it will be understood that any other means for giving the rotor an initial impetus can be employed.

It is also to be understood that all forms of my motor can be used as speed governing devices because of the inherent characteristic possessed by the motor of maintaining synchronous speed, even though there may be a strong tendency on the part of the device controlled to increase its speed beyond the synchronous value.

My invention is not limited to the particular embodiments thereof illustrated and described in detail herein but includes such modifications thereof as fall within the scope of the appended claims. For example, while my invention relates particularly to an improved hysteresis motor, yet it is to be understood that various features of my invention may be employed to advantage in motors that are not strictly of the hysteresis type. In this connection it will be noted that certain of the claims appended hereto are directed mainly to the novel construction of the primary element of the motor.

I claim:—

1. A hysteresis motor comprising a primary member having a plurality of pairs of pole pieces, means for producing in the primary member a stationary axis alternating field with alternate pole pieces of opposite polarity, and a secondary member of magnet material having substantially uniform reluctance in all directions, the said pole pieces being arranged so that the hysteresis torque is of greater magnitude than the eddy current torque throughout at least a portion of the starting period of the motor.

2. A hysteresis motor comprising a primary member having a plurality of pairs of pole pieces, means for producing in the primary member a stationary axis alternating field with alternate pole pieces of opposite polarity, and a secondary member of magnet material having substantially uniform reluctance in all directions, at least some of the pole pieces having the adjacent tips thereof sufficiently close together so that the hysteresis torque is of greater magnitude than the eddy current torque, throughout at least a portion of the starting period of the motor.

3. A hysteresis motor comprising a primary member having a plurality of pole pieces, means for producing in the primary member a stationary axis alternating field with alternate pole pieces of opposite polarity, and a secondary member of magnet material having substantially uniform reluctance in all directions, the said pole pieces being arranged so that the hysteresis torque is of greater magnitude than the eddy current torque throughout at least a portion of the starting period of the motor.

4. A hysteresis motor comprising a primary member having a plurality of pole pieces, means for producing in the primary member a stationary axis alternating field with alternate pole pieces of opposite polarity, and a secondary member of magnet material having substantially uniform reluctance in all directions, at least some of the pole pieces having the adjacent tips thereof sufficiently close together so that the hysteresis torque if of greater magnitude than the eddy current torque, throughout at least a portion of the starting period of the motor.

5. A hysteresis motor comprising a primary member having a plurality of pairs of pole pieces, means for producing in the primary member a stationary axis alternating field with alternate pole pieces of opposite polarity, and a secondary member of magnet material having substantially uniform reluctance in all directions, the said pole pieces being arranged so that the hysteresis torque is of greater magnitude than the eddy current torque a speeds between two thirds synchronous speed and synchronous speed.

6. A hysteresis motor comprising a primary member having a plurality of pole pieces, means for producing in the primary member a stationary axis alternating field with alternate pole pieces of opposite polarity, and a secondary member of magnet material having substantially uniform reluctance in all directions, the said pole pieces being arranged so as to provide an air gap of substantially uniform width at all points around the secondary member.

7. A motor comprising a primary member having a plurality of pole pieces, means for producing in the primary member a stationary axis alternating field with alternate pole pieces of opposite polarity, and a secondary member of magnet material, the said pole pieces being arranged in such close proximity to each other as to provide a low reluctance path for leakage flux.

8. A motor comprising a primary member having a plurality of pole pieces, means for producing in the primary member a stationary axis alternating field with alternate pole pieces of opposite polarity, and a secondry member of magnet material, the said pole pieces being arranged so that a field of gradually varying intensity is produced around the secondary member.

9. A motor comprising a primary member consisting of two field casing sections of magnetizable material each section being provided with a plurality of projections forming pole pieces and the two sections being arranged with the pole pieces of one section between the pole pieces of the other section and substantially in contact therewith, a magnetizing coil mounted between said casing sections and a rotor of magnet material disposed in close proximity to said pole pieces.

10. A motor comprising a primary member consisting of two field casing sections of magnetizable material each section being provided with a plurality of projections forming pole pieces and the two sections being arranged with the pole pieces of one section between the pole pieces of the other section and substantially in contact therewith, a magnetizing coil mounted between said casing sections and a rotor of magnet material disposed in close proximity to said pole pieces, the diameter of said rotor being at least as large as the outside diameter of said magnetizing coil.

11. An electric motor comprising a primary member having a plurality of pole-pieces, means for producing in the primary member a stationary axis alternating field with alternate pole-pieces of opposite polarity, and a secondary member operatively associated with the said primary member, the said pole-pieces being arranged in such close proximity to each other as to provide a low reluctance path for leakage flux.

12. An electric motor comprising a primary member having a plurality of pairs of pole pieces, and a secondary member operatively associated with said primary member, the said pole pieces being arranged in such close proximity to each other as to provide a low reluctance path for leakage flux.

13. A motor comprising a primary member consisting of two field casing sections of magnetizable material, each section being provided with a plurality of projections forming pole pieces, and the two sections being arranged with the pole pieces of one section between the pole pieces of the other section, a magnetizing coil mounted between said casing sections for producing in the primary member a stationary axis alternating field with alternate pole pieces of opposite polarity, and a rotor of magnet material disposed in close proximity to said pole pieces, the said pole pieces being arranged in such close proximity to each other as to provide a low reluctance path for leakage flux.

14. A motor comprising a primary member consisting of two field casing sections of magnetizable material, each section being provided with a plurality of projections forming pole pieces, and the two sections being arranged with the pole pieces of one section between the pole pieces of the other section, a magnetizing coil mounted between said casing sections for producing in the primary member a stationary axis alternating field with alternate pole pieces of opposite polarity, and a rotor of magnet material having substantially uniform reluctance in all directions and having a space relation with respect to the pole pieces greater than the spacing of the pole pieces with respect to one another.

15. A motor comprising a primary member consisting of two field casing sections of magnetizable material, one of the sections being formed to provide marginal projections extending at an angle with respect to the body of said section, and the other section being formed to provide projections extending radially and interposed between the projections of the first named section, a magnetizing coil mounted between the casing sections and within the space subtended by the angularly disposed projections of the first section for producing in the primary member a stationary axis alternating field with alternate pole pieces of opposite polarity, and a rotor of magnet material disposed in close proximity to said pole pieces, the spacing between the rotor and said pole pieces being greater than the spacing between the respective pole pieces.

16. A motor comprising a primary member consisting of two field casing sections of magnetizable material, one of the sections being formed to provide marginal projections extending at an angle with respect to the body of said section, and the other section being formed to provide projections extending radially with respect to said body section and interposed between the projections of the first named section, a magnetizing coil mounted between the casing sections and within the space subtended by the angularly disposed projections of the first section for producing in the primary member a stationary axis alternating field with alternate pole pieces of opposite polarity, and a rotor of magnet material having a diameter at least as large as the outside diameter of the magnetizing coil, and having a space relation with respect to the pole pieces greater than the spacing of the pole pieces with respect to one another.

17. A motor comprising two field casing sections of magnetizable material, each section being provided with a plurality of projections forming pole pieces, the polar projections of one section extending at right angles to and between the polar projections of the other section, and a coil for magnetizing said casing sections.

18. A motor comprising two field casing sections of magnetizable material, each section being provided with a plurality of projections forming pole pieces, and the two sections being arranged with the pole pieces of one section between the pole pieces of the other section with the polar projections of the two sections extending at an angle to each other, and a coil for magnetizing said casing sections.

19. A motor comprising two field casing sections of magnetizable material, each section being provided with a plurality of projections forming pole pieces, and the two sections being arranged with the pole pieces of one section between the pole pieces of the other section with the polar projections of the two sections extending at an angle to each other, a magnetizing coil mounted between said casing sections, and a rotor of magnet material having a portion thereof substantially coextensive with the magnetizing coil.

20. A motor comprising two field casing sections of magnetizable material, one of the sections having lateral marginal projections forming pole pieces and the other section having projections extending radially and interposed between the projections on the first-named section, and a coil for magnetizing said casing sections.

21. A motor comprising two field casing sections of magnetizable material, one of the sections having lateral marginal projections and the other section having projections extending radially and interposed between the projections on the first-named section, and a coil for magnetizing said casing sections, the said projections on the casing sections forming pole pieces disposed in a plane at one side of said magnetizing coil.

22. A motor comprising two field casing sections of magnetizable material one of said sections having marginal projections extending at an angle with respect to the body of said section and the other section having projections extending radially with respect to the body thereof and interposed between the projections of the other section, and a magnetizing coil mounted between said casing sections.

23. A motor comprising two field casing sections of magnetizable material one of said sections having lateral marginal projections forming pole pieces and the other section having polar projections extending radially with respect to the body thereof and interposed between the projections of the other section, a coil for magnetizing the casing sections, and a rotor of magnet material having a diameter at least as large as the outside diameter of said magnetizing coil.

24. An electric motor comprising a core member, a magnetizing coil surrounding said core member, a pair of supporting members of magnetizable material secured to said core member on opposite sides of said coil and pole pieces carried by each of said supporting members, the pole pieces carried by one supporting member extending between and at an angle to the pole pieces carried by the other supporting member with the ends of pole pieces carried by each member disposed in a plane at one side of said coil.

25. A synchronous motor comprising a primary member having a plurality of pole pieces, means for producing in the primary member a stationary axis alternating field with alternate pole pieces of opposite polarity, and a secondary member of magnet material having substantially uniform reluctance in all directions.

26. In a synchronous motor stator, a magnetic cup comprising a disc and integral peripheral flange, a magnetic core centered in said cup and extending to its open end, a plurality of teeth formed as projections of said flange and disposed in the cylinder formed by it, said teeth being spaced apart a distance greater than their width, a disc mounted on the free end of said core, and teeth on said disc, said teeth being formed normal to the plane of the disc and disposed with their outside faces on a cylinder of diameter equal to the diameter of said flange, and said disc being located with respect to the flange so that the teeth are centered in the spaces between the teeth on the flange.

27. A motor comprising two field casing sections of magnetizable material, each section being provided with a plurality of projections forming pole-pieces, and the two sections being arranged with the pole-pieces of one section between the pole-pieces of the other section with the polar-projections of the two sections extending at an angle to each other, a magnetizing coil mounted between said casing sections, and a rotor of magnet material having a portion thereof embracing at least some of the pole-pieces.

28. A motor comprising two field casing sections of magnetizable material one of said sections having lateral marginal projections forming pole-pieces and the other section having polar propections extending radially with respect to the body thereof and interposed between the projections of the other section, a coil for magnetizing the casing sections, and a rotor of magnet material having a peripheral portion embracing the ends of at least some of the projections on said casing sections.

29. A motor comprising a primary member consisting of two field casing sections of magnetizable material, one of the sections being formed to provide marginal projections extending at an angle with respect to the body of said section, and the other section being formed to provide projections extending radially with respect to and interposed between the projections of the first named section, a magnetizing coil mounted between the casing sections and within the space subtended by the angularly disposed projections of the first section for producing in the primary member a stationary axis alternating field with alternate pole pieces of opposite polarity, and a rotor of magnet material disposed in close proximity to said pole pieces.

30. A motor comprising a primary member consisting of two field casing sections of magnetizable material, one of the sections being formed to provide marginal projections extending at an angle with respect to the body of said section, and the other section being formed to provide projections extending radially with respect to said body section and interposed between the projections of the first named section, a magnetizing coil mounted between the casing sections and within the space subtended by the angularly disposed projections of the first section for producing in the primary member a stationary axis alternating field with alternate pole pieces of opposite polarity, and a rotor of magnet material configured to have a portion thereof in position to embrace and rotate around the pole pieces.

ARTHUR WILLIAM HAYDON.

---

CERTIFICATE OF CORRECTION.

Patent No. 1,935,208.   November 14, 1933.

ARTHUR WILLIAM HAYDON.

It is hereby certified that error appears in the printed specification of the above numbered patent requiring correction as follows: Page 5, line 136, for "section" read action; page 6, line 75, claim 4, for "if" read is; and line 87, claim 5, for "a" read at; page 8, line 33, claim 28, for "propections" read projections; and that the said Letters Patent should be read with these corrections therein that the same may conform to the record of the case in the Patent Office.

Signed and sealed this 9th day of January, A. D. 1934.

F. M. Hopkins (Seal)   Acting Commissioner of Patents.